United States Patent
Bastide et al.

(10) Patent No.: US 9,482,182 B2
(45) Date of Patent: Nov. 1, 2016

(54) ACTUATING DEVICE FOR MOVING A THRUST REVERSER

(71) Applicants: SAGEM DEFENSE SECURITE, Boulogne-Billancourt (FR); AIRCELLE, Gonfreville-l'Orcher (FR)

(72) Inventors: Christophe Bastide, Boulogne-Billancourt (FR); Franck Delnaud, Boulogne-Billancourt (FR); Mickael Werquin, Boulogne-Billancourt (FR); Nicolas Planquet, Boulogne-Billancourt (FR); Pascal Coppee, Boulogne-Billancourt (FR); Rinaldo Fadini, Boulogne-Billancourt (FR); Pierre Moradell-Casellas, Saint-Geroges-des-Groseillers (FR)

(73) Assignees: SAGEM DEFENSE SECURITE, Boulogne-Billancourt (FR); AIRCELLE, Gonfreville-l'Orcher (FR)

( * ) Notice: Subject to any disclaimer, the term of this patent is extended or adjusted under 35 U.S.C. 154(b) by 79 days.

(21) Appl. No.: 14/396,043

(22) PCT Filed: Apr. 23, 2013

(86) PCT No.: PCT/EP2013/058386
§ 371 (c)(1),
(2) Date: Oct. 21, 2014

(87) PCT Pub. No.: WO2013/160298
PCT Pub. Date: Oct. 31, 2013

(65) Prior Publication Data
US 2015/0377182 A1 Dec. 31, 2015

(30) Foreign Application Priority Data
Apr. 23, 2012 (FR) ...................... 12 53693

(51) Int. Cl.
| F02K 1/76 | (2006.01) |
| F16H 25/24 | (2006.01) |
| F16H 25/20 | (2006.01) |
| F16H 25/22 | (2006.01) |

(52) U.S. Cl.
CPC ............... *F02K 1/763* (2013.01); *F02K 1/766* (2013.01); *F16H 25/2454* (2013.01); *F16H 25/2204* (2013.01); *F16H 2025/2093* (2013.01)

(58) Field of Classification Search
CPC ..... F02K 1/763; F02K 1/766; F16H 25/2454
See application file for complete search history.

(56) References Cited

U.S. PATENT DOCUMENTS

| 5,404,714 | A | * | 4/1995 | Davies | ................... F02K 1/766 60/226.2 |
| 2003/0066284 | A1 | | 4/2003 | Chakkera et al. | |
| 2004/0206066 | A1 | * | 10/2004 | Eschborn | ............... B64D 33/04 60/223 |
| 2010/0319477 | A1 | * | 12/2010 | Tateishi | .............. F16H 25/2454 74/411.5 |

FOREIGN PATENT DOCUMENTS

| DE | 2615739 | * | 9/1977 | ............. B63H 23/02 |
| WO | WO 94/07018 | | 3/1994 | |

* cited by examiner

*Primary Examiner* — Andrew Nguyen
(74) *Attorney, Agent, or Firm* — Blakely Sokoloff Taylor & Zafman LLP (57) ABSTRACT

The invention concerns an actuating device (1) for moving a mobile cover of a thrust reverser, comprising: an actuator (5) comprising a first element (10), such as a screw, and a second element (12), such as a nut, mounted mobile device relative to the first element (10) such that the rotation of the first element (10) results in a translational movement of the second element (12) relative to the first element (10), and a locking device (31) comprising a rotating part (34) linked in rotation with the first element (10), and a locking part (35) that is mobile relative to the rotating part (34) between a locked position in which the locking part (35) is engaged with the rotating part (34) to prevent the first element (10) from rotating and an unlocked position in which the locking part (35) is disengaged from the rotating part to allow the rotation of the first element (10), and an electromagnet (39) for moving the locking part (35) to the unlocked position.

18 Claims, 10 Drawing Sheets

LOCKED POSITION

FIG. 4

UNLOCKED POSITION

LOCKED POSITION

FIG. 12  UNLOCKED POSITION

ACTUATING DEVICE FOR MOVING A THRUST REVERSER

FIELD OF THE INVENTION

The invention concerns an actuating device for moving a movable cover of a thrust reverser.

PRIOR ART

Aircraft propulsion units generally comprise a turbojet fixed to a wing or to the fuselage of the aircraft and a nacelle fixed to the turbojet as well as to the wing or fuselage. In the case of a bypass engine, the turbojet includes a compressor, a combustion chamber, a high-pressure turbine for driving the compressor and a low-pressure turbine for rotating a fan. The fan accelerates a cold airflow flowing in an annular duct defined between the turbojet and the nacelle in order to generate the thrust necessary for the propulsion of the aircraft.

Aircraft propulsion units generally comprise a thrust reversal system or TRAS ("Thrust Reverse Actuation System") for reversing the thrust in the landing phases in order to improve the braking capacity of the aircraft. Such a system comprises a set of movable covers actuated by associated actuators for temporarily obstructing the annular duct and diverting the cold airflow towards the front of the nacelle, thereby generating a counterthrust that is added to the braking of the wheels.

In the case of a so-called "door" thrust reversal system, the nacelle is equipped with movable covers (referred to as "doors") that pivot with respect to the structure of the nacelle between a retracted position in which they enable the airflow to flow in the duct towards the rear of the nacelle and a deployed position in which the doors block the airflow and reorient it towards the front of the nacelle.

In the case of a so-called "cascade" thrust reversal system, the nacelle is equipped with movable covers that slide with respect to the structure of the nacelle along rails between a retracted position in which they enable the cold airflow to flow in the duct towards the rear of the nacelle and a deployed position in which they leave clear diversion grilles disposed in the thickness of the nacelle and block the cold airflow in the annular duct by means of shutters, the actuation of which is linked to the movement of the covers.

In general terms, in one or other of the cases, the movable covers are actuated by a set of dedicated actuators. A mechanical synchronisation of the movement of the actuators is provided by a synchronisation system comprising flexible shafts for mechanically connecting the actuators together.

In addition, thrust reversal systems necessarily comprise several locking devices for preventing unwanted deployment of the covers in flight. Among the locking devices equipping thrust reversal systems, some locking systems referred to as "primary", or PLS ("Primary Lock System"), act on the flexible shaft in order to lock the flexible shaft with respect to rotation.

Document U.S. Pat. No. 6,786,039 describes a system for actuating a thrust reverser, comprising an actuator moved between a retracted configuration and a deployed configuration by means of a drive shaft connected to a flexible shaft. The system comprises a locking device that can be controlled so as to engage or disengage the drive shaft in order to prevent or enable rotation of the drive shaft. The system also comprises a locking inhibiter for holding the locking device in the disengaged position as long as the actuator is not in the retracted configuration.

One drawback of the system proposed is that the locking device is mounted projecting on the housing of the system, which may pose problems of distribution of weights and of space requirement.

In addition, the locking device comprises a locking rod that is moved by an electromagnet and which may be subjected to high radial forces because of the positioning of the locking device with respect to the actuator.

Moreover, the locking inhibiter includes an actuation rod that extends over the entire length of the actuator, which contributes to increasing the weight of the actuator.

SUMMARY OF THE INVENTION

One aim of the invention is to propose an actuating device that fits more easily in the thickness of the nacelle.

This problem is solved in the context of the present invention by means of an actuating device for moving a movable cover of a thrust reverser, comprising:
  an actuator comprising a first element and a second element mounted so as to be able to move in translation with respect to the first element, the first element and the second element forming a screw and a nut, the second element being able to be connected to the movable cover in order to move the movable cover between a deployed configuration and a retracted configuration,
  a drive shaft able to rotate about a rotation axis, the drive shaft having an end able to be connected to a motor shaft of the thrust reverser, and comprising a meshing part able to mesh with the first element in order to rotate the first element, so that a rotation of the first element causes a translation of the second element with respect to the first element, and
  a locking device comprising a part able to rotate about a rotation axis distinct from the rotation axis of the drive shaft, the rotary part being rotationally linked to the first element, a locking part able to move with respect to the rotary part between a locked position in which the locking part is engaged with the rotary part in order to prevent rotation of the first element and an unlocked position in which the locking part is disengaged from the rotary part in order to allow rotation of the first element, and an electromagnet for moving the locking part towards the unlocked position.

As the locking part acts on a rotary part distinct from the drive shaft, it is possible to arrange the locking device with respect to the actuator so that the locking device fits in the thickness of the nacelle.

In particular, the rotary part may be able to move in rotation about a rotation axis parallel to a rotation axis of the drive shaft and extending at a distance from the rotation axis of the drive shaft.

Alternatively, the rotary part can be able to move in rotation about a rotation axis inclined with respect to the rotation axis of the drive shaft. This configuration makes it possible to adjust an inclination of the rotation axis of the part so as to adapt the space requirement of the actuating device to the space available in the nacelle.

In addition, the locking part may be able to move in translation in a movement direction parallel to a rotation axis of the rotary part.

The actuating device may also have the following features:
- the first element forms the screw and the second element forms the nut,
- the rotary part comprises locking reliefs and the locking part comprises locking reliefs able to come opposite the locking reliefs of the rotary part in order to engage the locking part with the rotary part,
- the actuating device comprises a first pinion, and the rotary part comprises a second pinion meshing with the first pinion,
- the first pinion is mounted so as to be fixed to the drive shaft,
- the device comprises a third rotary shaft distinct from the drive shaft and the first pinion is mounted so as to be fixed to the third shaft,
- the locking device comprises a return member able to urge the locking part towards the locked position,
- the actuating device comprises a blocking part able to move between a blocking position in which the blocking part prevents movement of the locking part towards the locked position and an unblocking position in which the blocking part allows movement of the locking part towards the locked position,
- the blocking part is mounted so as to rotate about an axis parallel to a direction of movement of the locking part,
- the actuating device comprises a return member able to urge the blocking part towards the blocking position,
- the actuating device comprises a rod able to move in translation with respect to the first element, the rod being arranged so that, when the actuator is in the retracted configuration, the blocking part is urged by the second element towards the unblocking position, by means of the rod,
- the actuating device comprises a return member able to act on the rod by moving the rod away from the blocking part in order to allow the blocking part to return to the blocking position,
- the actuating device comprises a pusher able to move in translation with respect to the first element and extending around the first element, the pusher being able to be urged by the second element, when the second element moves with respect to the first element, towards the retracted configuration, the pusher being fixed to the rod,
- the movable rod extends at least partly inside the first element,
- the actuating device comprises a housing in which the drive shaft and the locking device are housed, and a universal joint extending around the housing in order to attach the housing to an aircraft nacelle,
- the actuating device comprises a manual unlocking device for bringing the locking part into the unlocked position during a maintenance operation.

The invention also relates to a thrust reverser comprising:
a movable cover,
a drive motor,
an actuating device as defined above, and
a flexible shaft connecting the drive motor to the drive shaft of the actuating device so that the motor rotates the drive shaft by means of the flexible shaft in order to deploy or retract the movable cover of the thrust reverser.

PRESENTATION OF THE DRAWINGS

Other features and advantages will also emerge from the following description, which is purely illustrative and non-limitative, and must be read with regard to the accompanying figures, among which.

DETAILED DESCRIPTION OF AN EMBODIMENT

In FIGS. 1 to 6, the actuating device 1 depicted comprises a drive shaft 2 having a first end 3 and a second end 4. The first end 3 is conformed so as to be able to be connected to a first motor shaft of a thrust reverser or flexible shaft (not shown), the first motor shaft being connected to a motor driving the actuating device 1. The second end 4 is conformed so as to be able to be optionally connected to a second motor shaft (not shown) of the thrust reverser, the second motor shaft being connected to a drive shaft of another similar actuating device so as to control the actuating devices in a synchronised manner.

The actuating device 1 also comprises an actuator 5, the movement of which is controlled by the drive shaft 2.

The actuator 5 comprises a housing 6 intended to be fixed to a nacelle of the aircraft. The actuator 5 also comprises a universal joint part 7 fixed firstly to the housing 6 by means of a first pivot connection 8 and secondly to the nacelle by means of a second pivot connection 9 with its axis perpendicular to the axis of the first pivot connection.

The actuator 5 comprises a screw 10 having a body 11 with elongate cylindrical shape overall, and a nut 12 extending around the body 11 of the screw.

The screw 10 is mounted so as to be able to rotate with respect to the casing 6 about a rotation axis X corresponding to the longitudinal axis of the screw 10 and also corresponding to a deployment axis of the actuator 5. The screw 10 comprises a first end 13 (or receiving end) intended to receive a drive torque and a second end 14 (or free end). The screw 10 is mounted so as to be able to rotate with respect to housing 6 by means of a ball bearing 15 arranged between the screw and the housing 6. The actuator 5 comprises a conical input pinion 16 mounted so as to be fixed to the screw 10, at the first end 13 of the screw 10. The conical input pinion 16 meshes with a meshing part 17 of the drive shaft 2 so as to transmit a rotation movement from the drive shaft 2 to the screw 10.

The nut 12 is intended to be connected to an actuating tube (not shown) having one end connected to a movable component of the thrust reverser (a movable shutter for example) by means of a swivel connection.

The nut 12 is mounted so as to be able to move in translation with respect to the screw 10 on the longitudinal axis X of the screw 10 in order to move the actuating tube between two extreme positions corresponding respectively to a retracted configuration and to a deployed configuration of the actuator 5.

The body 11 of the screw 10 has a cylindrical external surface 18 in which a helical groove 19 is formed. The nut 12 has a cylindrical internal surface 20 in which a helical groove 21 is formed. The screw 10 and the nut 12 cooperate with each other by means of helical grooves 19 and 21 in which balls are housed so that rotation of the screw 10 with respect to the housing 6 causes translation of the nut 12 with respect to the screw 10 in the direction X.

The actuator 5 also comprises a stop part 22 secured to the screw 10. The stop part 22 comprises a cylindrical part 23 extending around the screw 10 and fixed to the screw 10 by fixing studs 56.

The actuator 5 also comprises a pusher 24 mounted so as to be able to move in translation with respect to the screw 10. The pusher 24 extends between the stop 22 and the screw 10. The pusher 24 comprises a cylindrical ring 25 extending around the screw 10. The cylindrical ring 25 is positioned so as to be pushed by the nut 12 when the nut 12 approaches the extreme position corresponding to a retracted configuration of the actuator. This has the effect of moving the pusher 24 with respect to the screw 10 towards the first end 13 of the screw 10.

The actuator 5 comprises a return member 26, such as a compression spring for example, arranged between the stop part 22 and the pusher 24. The return member is able to urge the pusher 24 in the opposite direction (that is to say towards the second end 14 of the screw 10), which has the effect of moving the pusher 24 towards the second end 14 of the screw 10 when the nut 12 moves away from the retracted position.

The actuator 5 also comprises an unblocking rod 27. The unblocking rod 27 extends inside a longitudinal bore 28 of the screw 10. The unblocking rod 27 is able to slide with respect to the screw in the longitudinal bore. The unblocking rod 27 is mounted so as to be fixed to the pusher 24 by means of a stud 29 connecting the unblocking rod 27 and the pusher 24, in a transverse direction with respect to the axis X. The stud 29 is able to slide in a radial slot 30 formed in the body 11 of the screw 10.

The actuating device 1 also comprises a locking device 31.

The locking device 31 comprises a secondary shaft 32 mounted fixedly with respect to the housing 6. The secondary shaft 32 extends along the drive shaft 2, parallel to the drive shaft 2, in a direction Y perpendicular to the axis X.

The locking device 31 also comprises a first toothed pinion 33 mounted so as to be fixed to the drive shaft 2 and a second toothed pinion 34 (a loose pinion) mounted so as to rotate on the secondary shaft 32. The second pinion 34 is mounted so as to rotate with respect to the secondary shaft 32 on a rotation axis which is the axis Y of the secondary shaft 32. The second pinion 34 meshes with the first pinion 33 so that the second pinion 34 is linked in rotation with the drive shaft 2.

The driving of the second pinion 34 by the first pinion 33 enables the forces exerted on the parts of the device to be adjusted by an adjustment of the reduction ratio.

The locking device 31 also comprises a locking part 35 mounted so as to be able to move in translation along the secondary shaft 32 between a locked position (illustrated in FIGS. 3 and 5) in which the locking part 35 is engaged with the second pinion 34 and an unlocked position (illustrated in FIGS. 4 and 6) in which the locking part 35 is disengaged from the second pinion 34.

To this end, the locking part 35 comprises reliefs 54 and the second pinion 34 comprises reliefs 55, these reliefs being teeth for example, the reliefs 54 and 55 being able to come opposite each other while being interposed with each other in order to engage the locking part 35 with the second pinion 34. In the event of a rotation of the second pinion 34, the reliefs 55 come into radial abutment against the reliefs 54 on the locking part 35.

The secondary shaft 32 has a cylindrical external surface 36 comprising a fluted guide portion 37, in which flutes are formed extending in a longitudinal direction of the secondary shaft 32 (direction Y). The locking part 35 has an internal cylindrical surface 38 in which flutes are also formed. The flutes on the locking part 35 cooperate with the flutes on the secondary shaft 32 in order to translationally guide the locking part along the secondary shaft 32 while preventing a rotation of the locking part 35 with respect to the secondary shaft 32.

The locking device 31 also comprises a solenoid 39, a sleeve 40 mounted so as to be able to move in translation along the secondary shaft 32 and a magnetic core 41 mounted so as to be fixed to the movable sleeve 40. The movement of the movable sleeve 40 is controlled by a magnetic field generated by the solenoid 39 that acts on the electromagnetic core 41 when the solenoid 39 is supplied with electrical energy.

The locking device 31 also comprises a nut 42 mounted so as to be fixed to the locking part 35 and connected to the movable sleeve 40 while allowing a lateral clearance between the nut 42 and the movable sleeve 40. The lateral clearance prevents the locking part 35 from transmitting radial forces to the movable sleeve 40.

The activation of the solenoid 39 has the effect of moving the movable sleeve 40 and concomitantly the locking part 35 towards the unlocked position.

The locking device 31 also comprises a return member 43 in the form of a compression spring arranged between the solenoid 39 and the nut 42 in order to urge the locking part 35 towards the locked position by means of the nut 42.

The locking device 31 also comprises metal targets 43 mounted so as to be fixed to the locking part 35, and sensors 44 mounted on a cover 45 of the housing 6, each sensor 44 being positioned opposite an associated metal target 43. Each sensor 44 is able to detect a position of the metal target 43 situated opposite with respect to the sensor 44. The sensors 44 are able to generate signals representing the locked or unlocked state of the locking device.

The locking device 31 also comprises manual unlocking means 46 for bringing the locking part 35 into the unlocked position during a maintenance operation.

Finally, the actuating device 31 comprises a blocking device 47 for selectively preventing or enabling locking of the actuator 5.

The blocking device 47 comprises a blocking part 48 (or rocker) able to move between a blocking position (illustrated in FIGS. 4 and 6) in which the blocking part 48 prevents movement of the locking part 35 towards the locked position and an unblocking position (illustrated in FIGS. 3 and 5) in which the blocking part 48 allows movement of the locking part 35 towards the locked position.

The blocking part 48 is mounted so as to rotate with respect to the housing 6 around a rotation axis Y' parallel to the axis Y of the secondary shaft, that is to say parallel to the direction of movement of the locking part 35.

The blocking part 48 comprises a first arm 49 (or blocking arm) and a second arm 50 (or unblocking arm). The first arm 49 and the second arm 50 extend from the rotation axis Y' of the blocking part 48 forming a non-zero angle between them. The first arm 49 and the second arm 50 have respectively free ends 51 and 52, the free end 51 of the first arm 49 having a curved shape.

When the blocking part 48 is in the blocking position, the first arm 49 comes to be interposed between the locking part 35 and the second pinion 34 so as to prevent the locking part 35 and the second pinion 34 coming into engagement. More precisely, the nut 42 comes into abutment against the free end 51 of the first arm 49 of the blocking part 48.

The blocking device 47 also comprises a return member 53, such as a torsion spring for example, suitable for urging the blocking part 48 towards the blocking position.

The second arm 50 is arranged so that the unblocking rod 27 is able to come into contact with the second arm 50, at the free end 52, in order to push the blocking part 48 and make it pivot towards the unblocking position.

As will have been understood, the positioning of the secondary shaft 32 parallel to the drive shaft 2 allows a freedom of installation of the locking device 31 around the drive shaft, which makes it possible to adapt the position of the locking device to the space constraints inside the nacelle.

Figure 1:
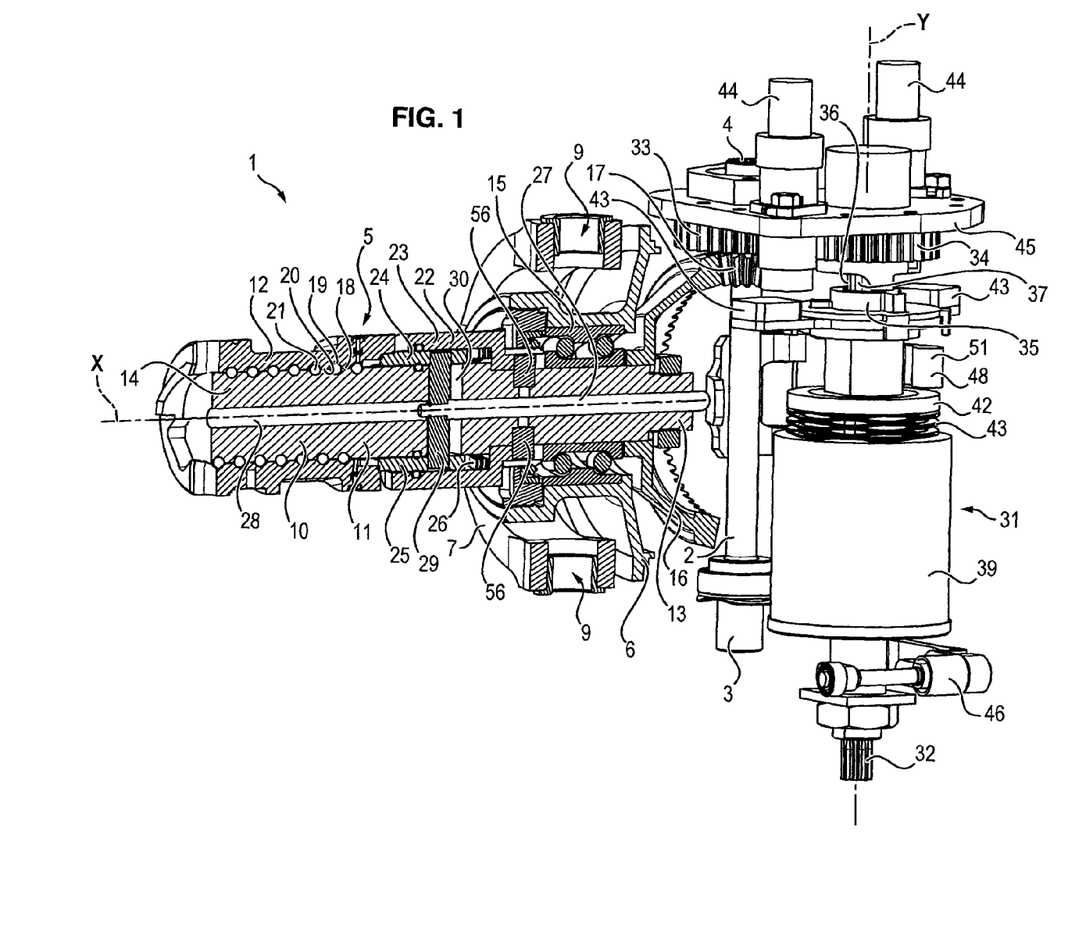
FIG. 1 depicts schematically an actuating device according to a first embodiment of the invention, in a view from a first side and in partial longitudinal section.
Figure 2:
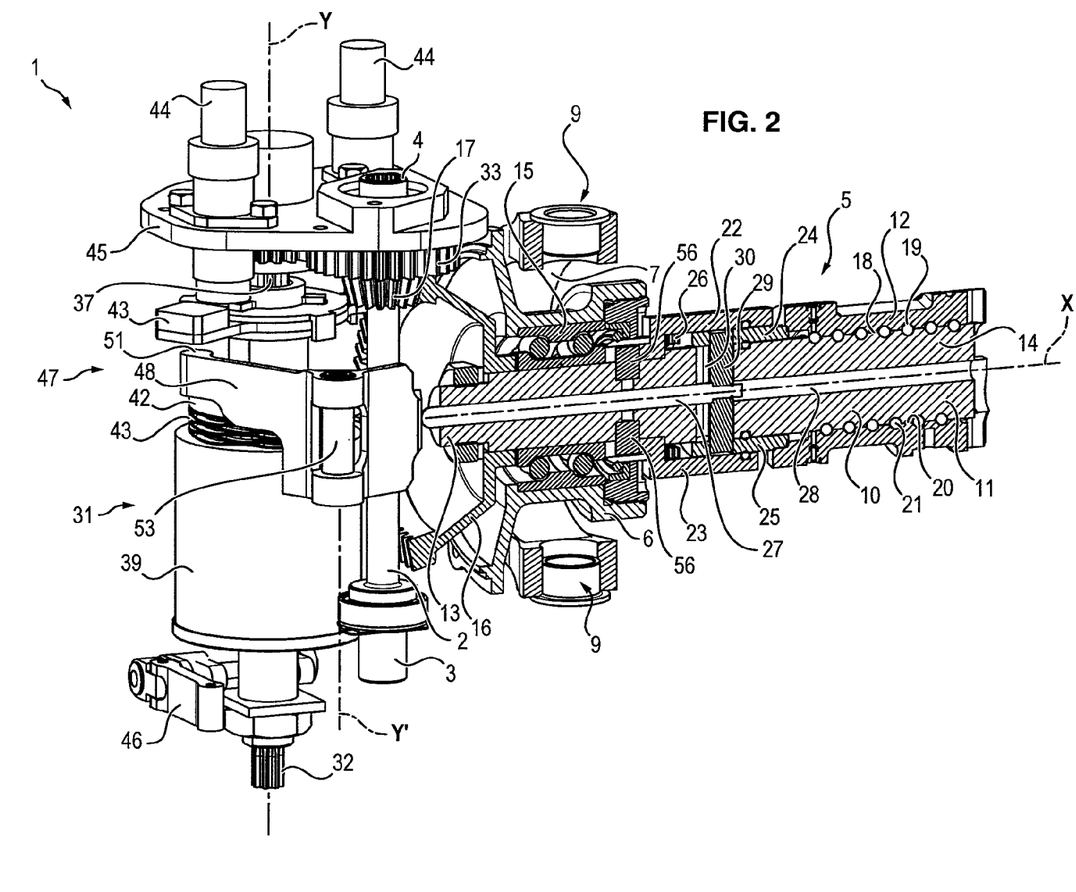
FIG. 2 depicts schematically the actuating device of FIG. 1 in a view from a second side opposite to the first side and in partial longitudinal section.
Figure 3:
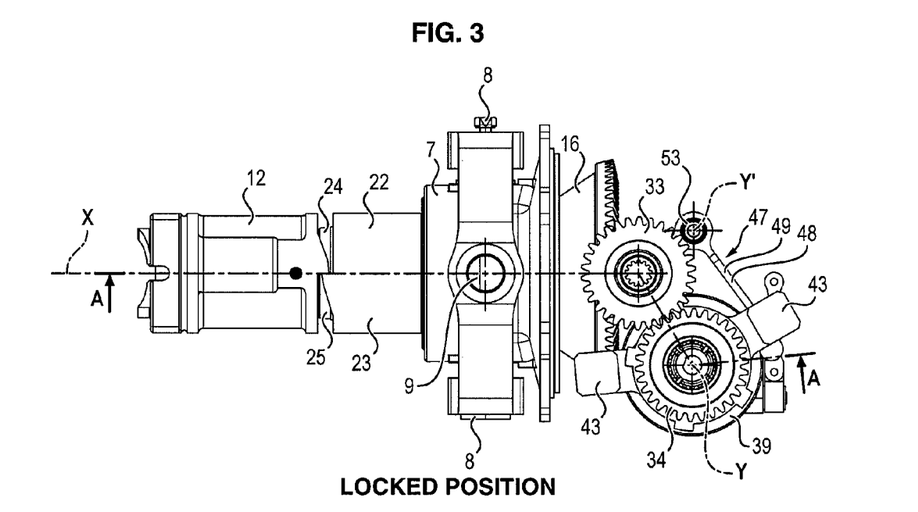
FIGS. 3 and 4 depict schematically the device of FIG. 1, in plan view, respectively in the locked position and the unlocked position.
Figure 5:
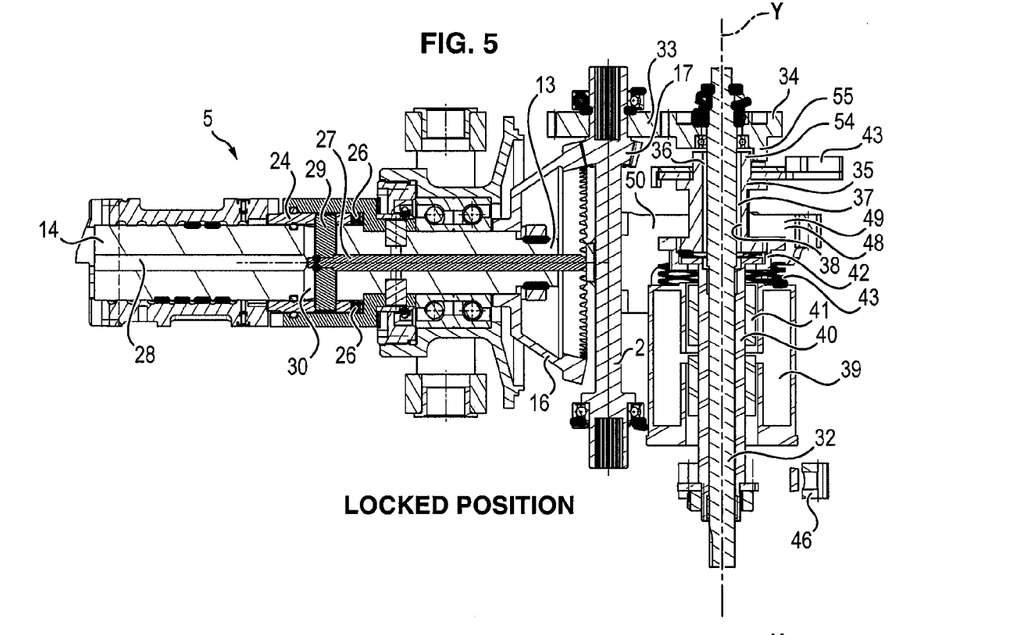
FIGS. 5 and 6 depict schematically the device of FIG. 1, in longitudinal section, respectively in the locked position and the unlocked position.

In operation, the actuator 5 is initially in the retracted configuration and the locking device 31 is locked (FIGS. 3 and 5).

In this configuration, the nut 12 is in abutment against the stop part 22. In this extreme position, the nut 12 urges the pusher 24 towards the first end 13 of the screw 10, which has the effect of compressing the spring 26 and pushing the unblocking rod 27 towards the blocking part 48. The blocking part 48 is thus held by the rod 27 in the unblocked position.

In addition, the locking part 35 is in the locked position. In this position, the locking part 35 is in engagement with the second pinion 34. More precisely, the reliefs 54 on the locking part 35 are positioned opposite the reliefs 55 on the second pinion 34 while being interposed with the reliefs 55, which prevents any rotation of the second pinion 34.

As the first pinion 33 and the second pinion 34 are linked in rotation, the locking device 31 prevents any rotation of the drive shaft 2 and consequently prevents any movement of the actuator 5.

As the actuator 5 is locked, an unwanted deployment of the thrust reverser is not possible.

Figure 6:
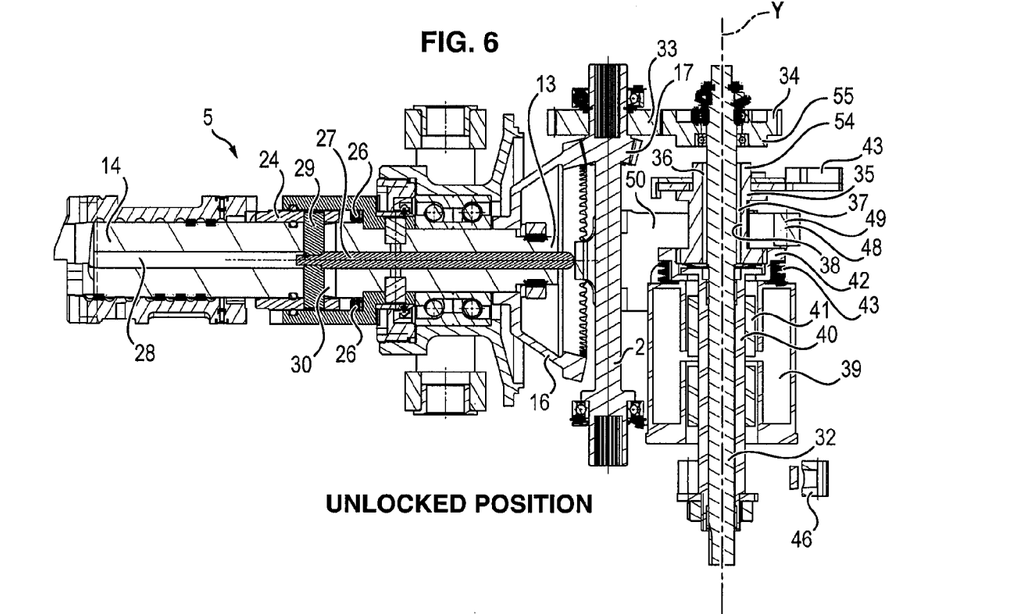
Figure 7:
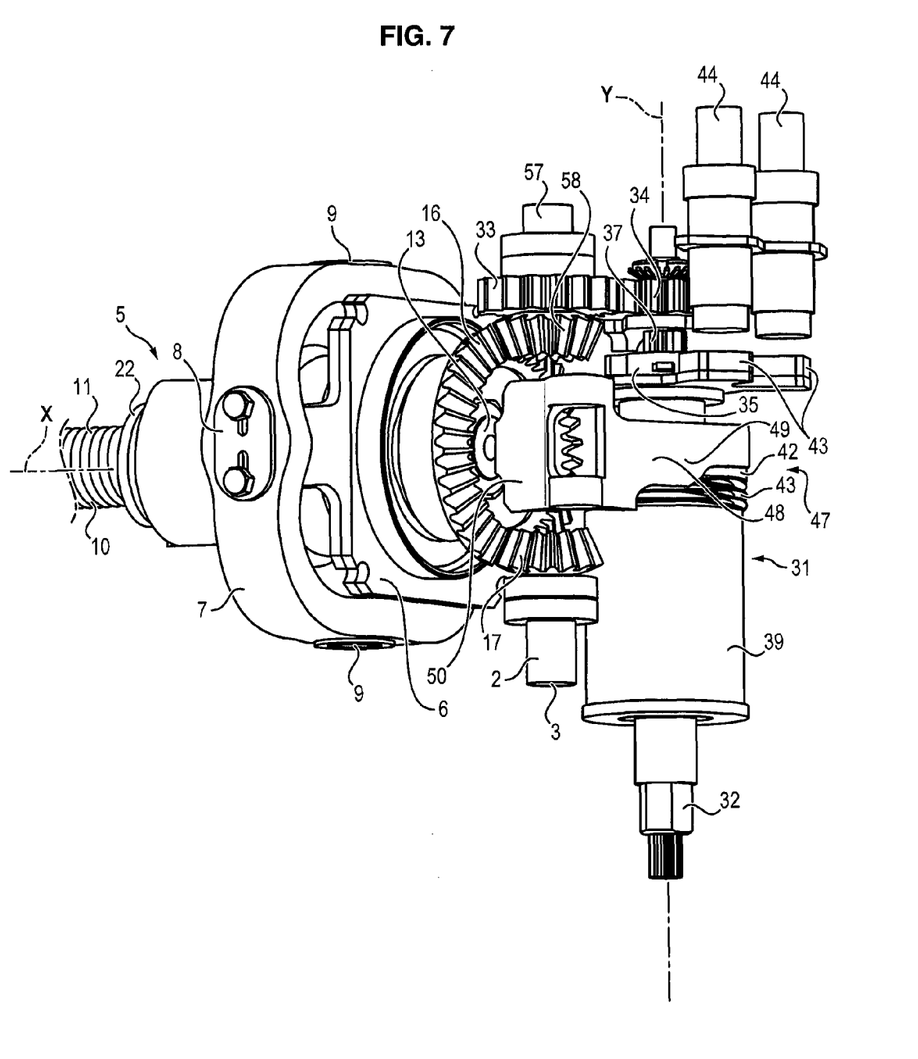
FIG. 7 depicts schematically an actuating device according to a second embodiment of the invention, in a view from a first side.
Figure 8:
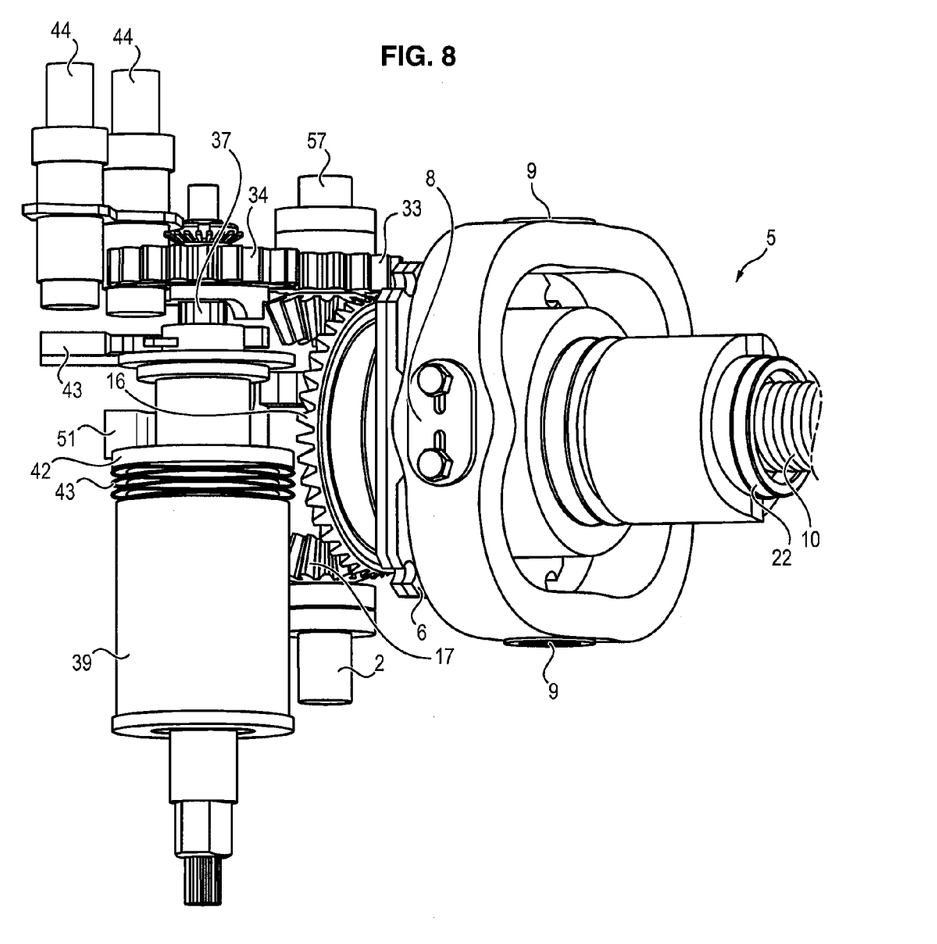
FIG. 8 depicts schematically the actuating device of FIG. 7 in a view from a second side opposite to the first side.
Figure 9:
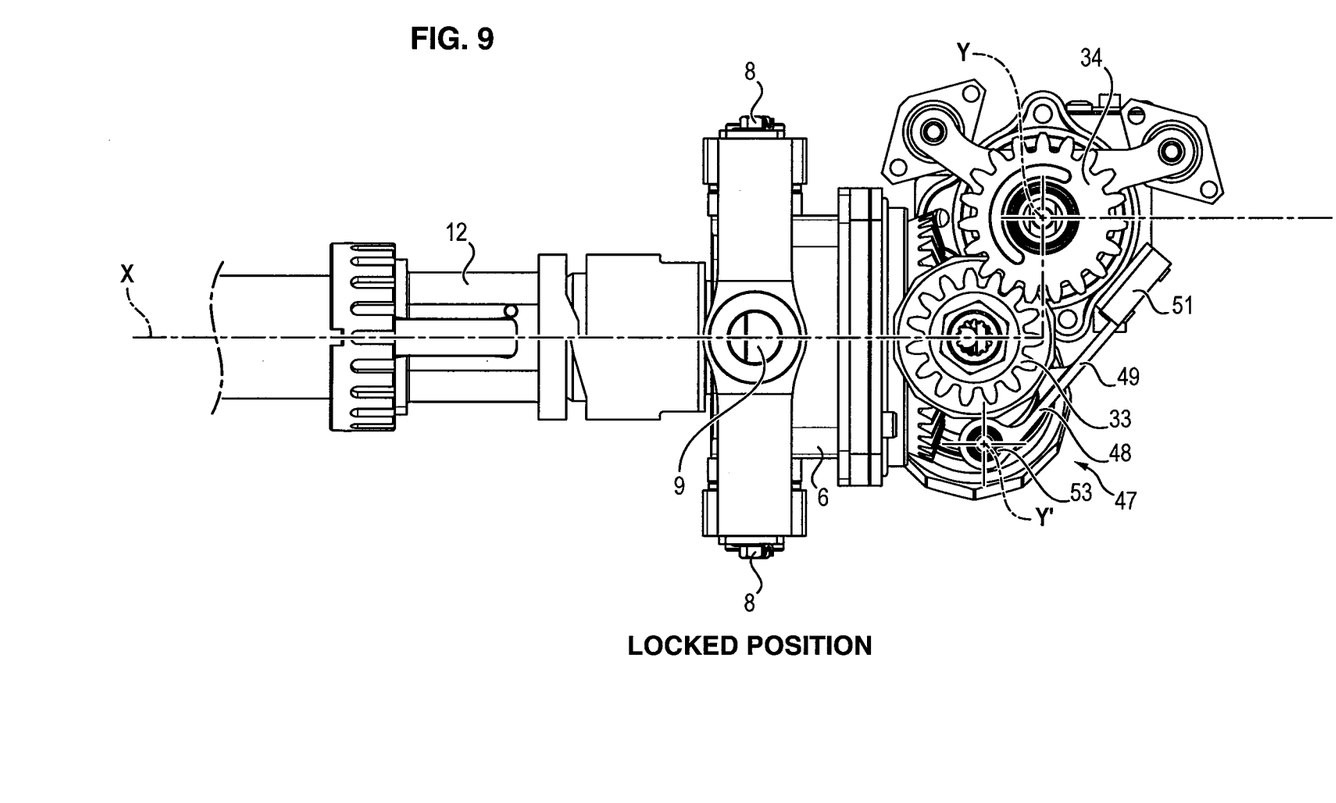
FIGS. 9 and 10 depict schematically the device of FIG. 7 in plan view, respectively in the locked position and in the unlocked position.
Figure 10:
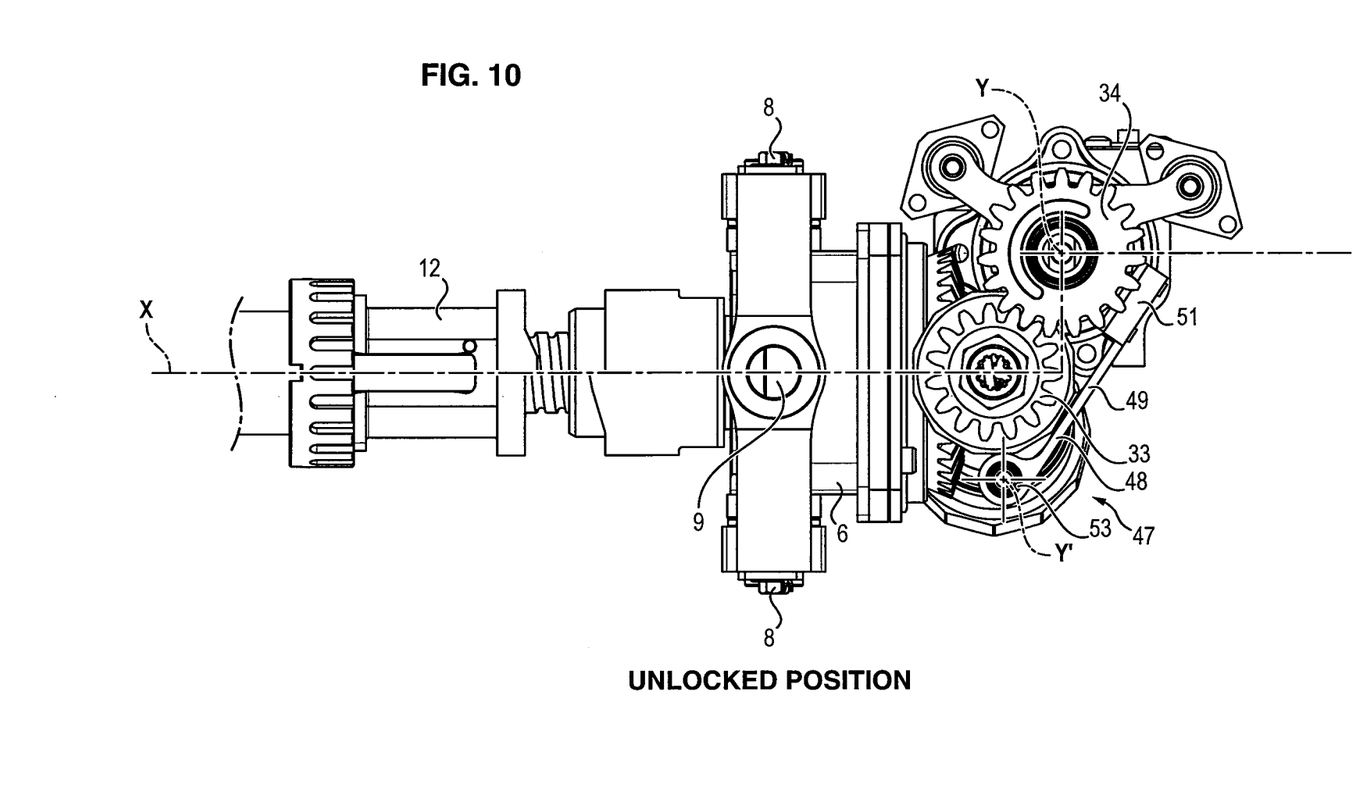

When the pilot demands deployment of the thrust reverser, a control system triggers the power supply to the solenoid 39, which has the effect of moving the locking part 35 from the locked position (FIG. 5) to the unlocked position (FIG. 6).

Once the locking part 35 is in the unlocked position, the locking part 35 is disengaged from the second pinion 34. More precisely, the reliefs 54 on the locking part 35 are no longer interposed with reliefs 55 on the second pinion 34, which allows rotation of the second pinion 34 about the secondary shaft 32 and consequently the drive shaft 2.

During the deployment of the actuator, the drive shaft 2 is rotated in a first direction by the drive motor of the actuating device 1 by means of the first motor shaft. The drive shaft 2 rotates the screw 10 by means of the meshing part 17 and the conical input pinion 16. The rotation of the screw 10 with respect to the nut 12 drives the nut 12 in translation with respect to the screw 10 along the axis X, in the direction of deployment of the actuator 5.

As the nut 12 is no longer in abutment against the abutment part 22, the nut 12 releases the pusher 24. The spring 26 urges the pusher 24 towards the second end 14 of the screw 10, which has the effect of moving the unblocking rod 27 away from the blocking part 48.

Figure 4:
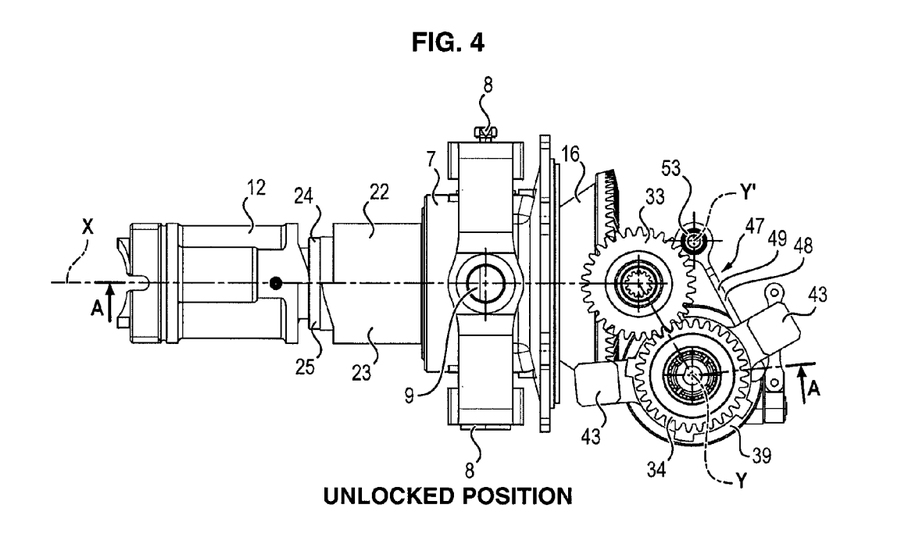

As the blocking part 48 is no longer acted on by the rod 27, the spring 53 returns the blocking part 48 to the blocked position. The blocking part 48 pivots so that the first arm 49 comes to be positioned on the path of the nut 42 (FIGS. 4 and 6). When the blocking part 48 is in the blocked position, the blocking part 48 prevents return of the locking part 35 to the locked position.

Thus the blocking device 47 prevents locking of the actuator 5 as long as the thrust reverser is not completely retracted.

When the pilot demands retraction of the thrust reverser, the drive shaft 2 is rotated in a second direction, opposite to the first direction, by the motor driving the actuating device 1 by means of the first motor shaft. The drive shaft 2 rotates the screw by means of the meshing part 17 and the conical input pinion 16. The rotation of the screw 10 with respect to the nut 12 causes a translation of the nut 12 with respect to the screw 10 along the axis X in the direction of retraction of the actuator 5.

When the actuator 5 is almost completely retracted, the nut 12 urges the pusher 24 towards the first end 13 of the screw 10, which has the effect of compressing the spring 26 and pushing the unblocking rod 27 towards the blocking part 48.

The unblocking rod 27 then urges the blocking part 48 towards the unblocked position. More precisely, the rod 27 pushes the second arm 50 of the blocking part 48, which has the effect of pivoting the blocking part 48 towards the unblocked position.

Once the nut 12 is in abutment against the stop part 22, the actuator 5 is completely retracted. The blocking part 48 releases the passage of the nut 42 and allows movement of the locking part 35 towards the locked position.

The spring 43 causes an automatic movement of the locking part 35 into the locked position. The locking of the actuator is thus achieved without requiring a supply of electrical energy.

Once the actuator 5 is locked by the locking device 31, the deployment of the actuator is no longer possible, without previously having demanded unlocking of the unlocking device.

The actuating device that has just been described has the advantage of being able to be easily integrated at the head of a pre-existing actuator since the locking device can interface with a standard drive shaft.

FIGS. 7 to 12 depict an actuating device according to a second embodiment of the invention. In these figures, numerical references identical to those in FIGS. 1 to 6 have been associated with the components that are identical to those of the first embodiment.

In FIGS. 7 to 12, the actuating device 1 depicted differs from the device in FIGS. 1 to 6 in that it does not comprise a second end conformed so as to be able to be connected to a second motor shaft of the thrust reverser.

The actuating device thus comprises a drive shaft 2 having a first end 3. The first end 3 is conformed so as to be able to be connected to a first motor shaft of a thrust reverser or flexible shaft (not shown), the first motor shaft being connected to a motor driving the actuating device 1.

The conical input pinion 16 meshes with a meshing part 17 of the drive shaft 2, so as to transmit a rotation movement from the drive shaft 2 to the screw 10.

The actuating device 1 depicted also differs from the device in FIGS. 1 to 6 in that it comprises a third shaft 57, distinct from the drive shaft 2, but extending in a direction parallel to the direction of the drive shaft 2. The third shaft 57 is mounted so as to rotate with respect to the housing 6 and comprises a meshing part 58 able to mesh with the conical input pinion 16, so that a rotation of the screw 10 about the axis X causes a rotation of the third shaft 57.

In this second embodiment, the first toothed pinion 33 is not mounted on the drive shaft 2 but is mounted so as to be fixed on the third shaft 57.

The second toothed pinion 34, which is mounted so as to rotate with respect to the secondary shaft 32, meshes with the first pinion 33 so that the second pinion 34 is rotationally linked to the screw 10.

Figure 11:
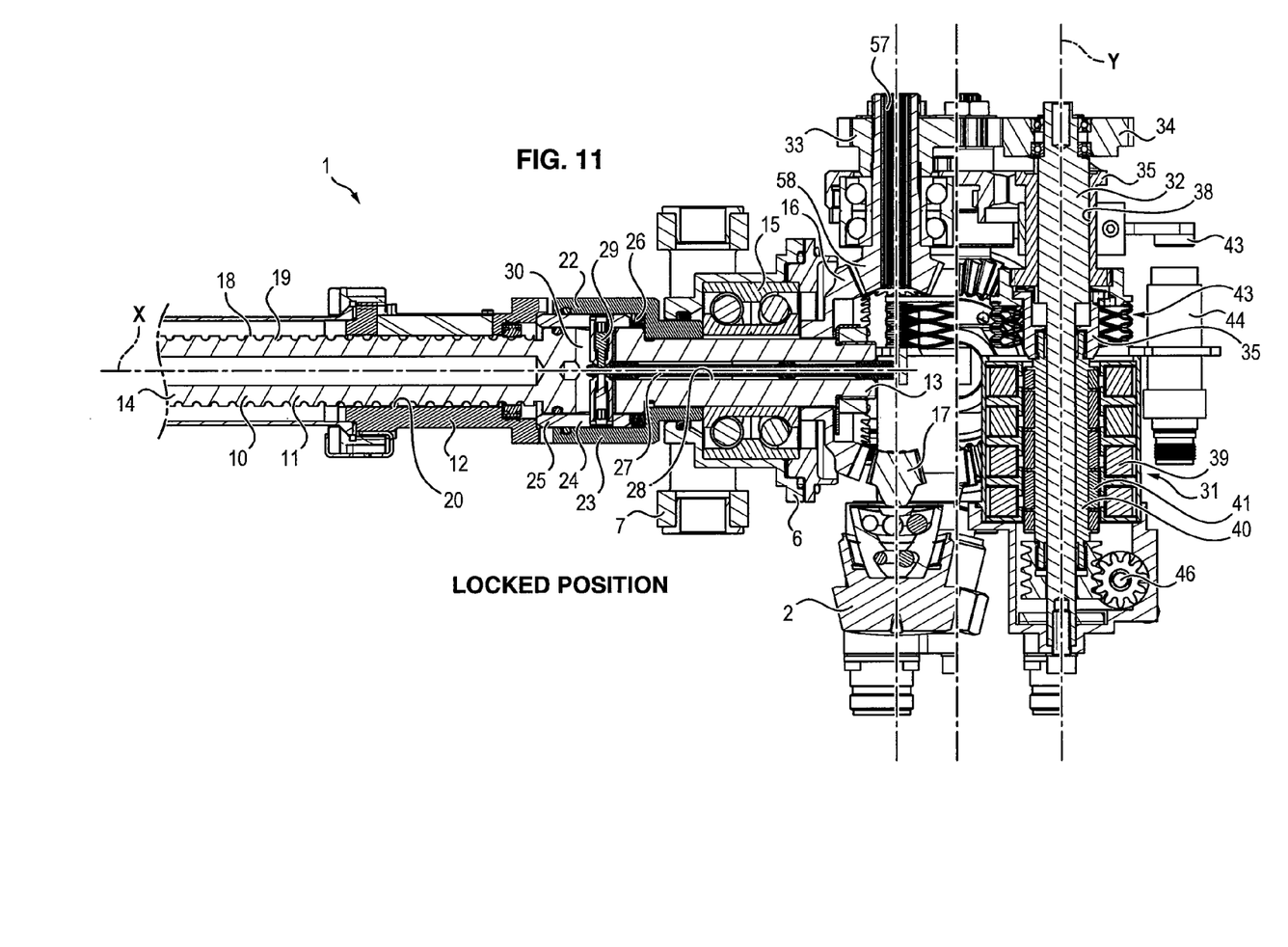
FIGS. 11 and 12 depict schematically the device of FIG. 7, in longitudinal section, respectively in the locked position and in the unlocked position.

As the first pinion 33 and the second pinion 34 are rotationally linked, the locking device 31 prevents any rotation of the screw 10 when the locking part 35 is in the locked position.

Figure 12:
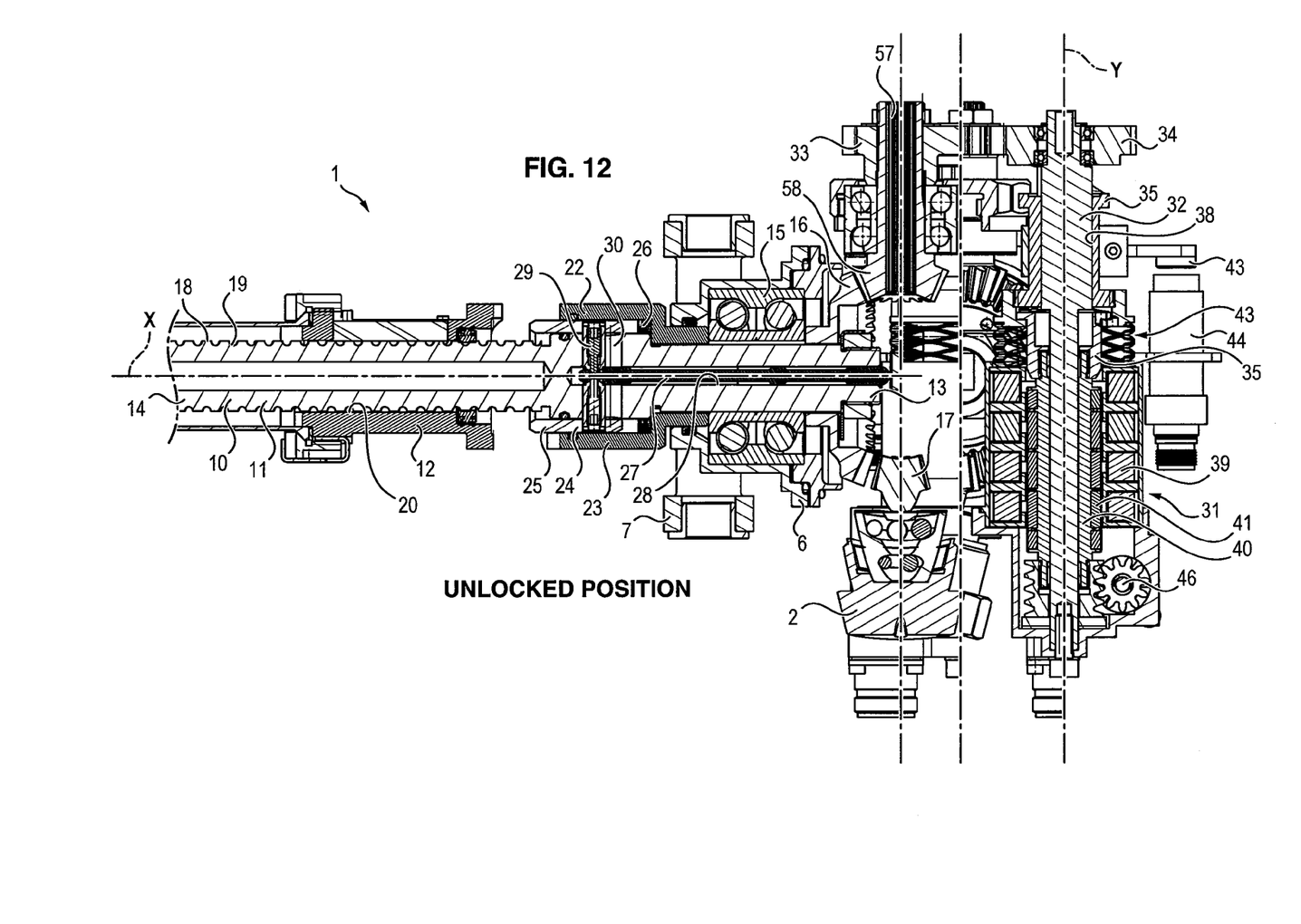

When the locking part 35 is in the unlocked position, the second pinion 34 and consequently the first pinion 33 can be rotated and thus allow a rotation of the screw 10.

The invention claimed is:

1. Actuating device (1) for moving a movable cover of a thrust reverser, comprising:
    an actuator (5) comprising a first element (10) and a second element (12) mounted so as to be able to move in translation with respect to the first element (10), the first element (10) and the second element (12) forming a screw and a nut, the second element (12) being able to be connected to the movable cover in order to move the movable cover between a deployed configuration and a retracted configuration,
    a drive shaft (2) having an end (3) able to be connected to a motor shaft of the thrust reverser, and comprising a meshing part (17) able to mesh with the first element (10) in order to rotate the first element (10) with respect to the second element (12), so that the rotation of the first element causes a translation of the second element (12) with respect to the first element (10),
    a locking device (31) comprising a part (34) able to rotate about a rotation axis distinct from a rotation axis of the drive shaft, the rotary part (34) being rotationally linked to the first element (10), a locking part (35) able to move with respect to the rotary part (34) between a locked position in which the locking part (35) is engaged with the rotary part (34) in order to prevent rotation of the first element (10) and an unlocked position in which the locking part (35) is disengaged from the rotary part (34) in order to allow rotation of the first element (10), and an electromagnet (39) for moving the locking part (35) towards the unlocked position, and
    a blocking part (48) able to move between a blocking position in which the blocking part (48) prevents a movement of the locking part (35) towards the locked position and an unblocking position in which the blocking part (48) allows movement of the locking part (35) towards the locked position.

2. Device according to claim 1, in which the rotary part (34) is able to move in rotation about the rotation axis (Y') parallel to the rotation axis (Y) of the drive shaft (2), and positioned at a distance from the rotation axis (Y) of the drive shaft (2).

3. Device according to claim 1, in which the rotary part (34) is able to move in rotation about the rotation axis (Y') inclined with respect to the rotation axis (Y) of the drive shaft (2).

4. Device according to claim 1, in which the locking part (35) is able to move in translation in a movement direction parallel to the rotation axis (Y') of the rotary part (34).

5. Device according to claim 1, in which the first element (10) forms the screw and the second element (12) forms the nut.

6. Device according to claim 1, in which the rotary part (34) comprises locking reliefs (55) and the locking part (35) comprises locking reliefs (54) able to come opposite the locking reliefs (55) on the rotary part (34) in order to engage the locking part (35) with the rotary part (34).

7. Device according to claim 1, comprising a first pinion (33), and in which the rotary part (34) comprises a second pinion (34) meshing with the first pinion (33).

8. Device according to claim 7, in which the first pinion is mounted so as to be fixed to the drive shaft (2).

9. Device according to claim 7, comprising a third rotary shaft (57) distinct from the drive shaft (2), and in which the first pinion (33) is mounted so as to be fixed to the third shaft (57).

10. Device according to claim 1, in which the locking device (31) comprises a return member (43) suitable for urging the locking part (35) towards the locked position.

11. Device according to claim 1, in which the blocking part (48) is mounted so as to rotate about an axis parallel to a movement direction of the locking part (35).

12. Device according to claim 1, comprising a return member (53) able to urge the blocking part (48) towards the blocking position.

13. Device according to claim 1, comprising a rod (27) able to move in translation with respect to the first element (10), the rod (27) being arranged so that, when the actuator (5) is in the retracted configuration, the blocking part (48) is urged by the second element (12) towards the unblocking position, by means of the rod (27).

14. Device according to claim 13, comprising a return member (26) able to act on the rod (27) by moving the rod away from the blocking part (48) so as to enable the blocking part (48) to return to the blocking position.

15. Device according to claim 13, comprising a pusher (24) able to move in translation with respect to the first element (10) and extending around the first element (10), the pusher (24) being able to be urged by the second element (12) when the second element (12) moves with respect to the first element (10) towards the retracted configuration, the pusher (24) being fixed to the rod (27).

16. Device according to claim 13, in which the movable rod (27) lies at least partly inside the first element (10).

17. Device according to claim 1, comprising a housing (6) in which the drive shaft (2) and the locking device (31) are housed, and a universal joint (7) extending around the housing to attach the housing (6) to a nacelle of an aircraft.

18. Device according to claim 1, comprising a manual unlocking device (46) for bringing the locking part (35) into the unlocked position during a maintenance operation.

* * * * *